US008628604B2

(12) United States Patent
Moll et al.

(10) Patent No.: US 8,628,604 B2
(45) Date of Patent: Jan. 14, 2014

(54) VAPOR COMPRESSION STEAM STRIPPING

(75) Inventors: Benjamin Moll, Davis, CA (US); Edwin Malkiel, Naples, FL (US); Rong Dong, Bonita Springs, FL (US)

(73) Assignee: Algenol Biofuels Inc., Fort Myers, FL (US)

( * ) Notice: Subject to any disclaimer, the term of this patent is extended or adjusted under 35 U.S.C. 154(b) by 0 days.

(21) Appl. No.: 13/481,143

(22) Filed: May 25, 2012

(65) Prior Publication Data

US 2012/0232315 A1    Sep. 13, 2012

Related U.S. Application Data

(63) Continuation of application No. PCT/US2011/025225, filed on Feb. 17, 2011.

(60) Provisional application No. 61/305,530, filed on Feb. 17, 2010.

(51) Int. Cl.
B01D 19/00    (2006.01)

(52) U.S. Cl.
USPC ............. 95/257; 95/263; 203/17; 203/19; 203/14; 202/158; 202/159; 202/160; 202/154

(58) Field of Classification Search
None
See application file for complete search history.

(56) References Cited

U.S. PATENT DOCUMENTS

| 3,956,072 | A | * | 5/1976  | Huse ............................ 202/177 |
| 4,294,664 | A |   | 10/1981 | Anthony |
| 4,374,705 | A | * | 2/1983  | Sawai et al. ..................... 203/19 |
| 4,444,571 | A |   | 4/1984  | Matson |
| 4,539,076 | A | * | 9/1985  | Swain ............................ 202/154 |
| 4,626,321 | A |   | 12/1986 | Grethlein et al. |
| 4,769,113 | A |   | 9/1988  | Sears |
| 5,124,004 | A | * | 6/1992  | Grethlein et al. ................ 203/19 |
| 5,772,850 | A |   | 6/1998  | Morris |
| 5,968,321 | A |   | 10/1999 | Sears |
| 6,306,639 | B1 |  | 10/2001 | Woods et al. |
| 6,899,743 | B2 |  | 5/2005  | Wijmans et al. |
| 2007/0031954 | A1 | | 2/2007 | Mairal et al. |
| 2009/0057128 | A1 | * | 3/2009 | Vane et al. ........................ 203/17 |
| 2009/0215139 | A1 | | 8/2009 | Datta et al. |

FOREIGN PATENT DOCUMENTS

| WO | WO2011017172 | 2/2011 |
| WO | WO2011103277 | 8/2011 |

OTHER PUBLICATIONS

Vane, Alvarez, Huang, and Baker, "Experimental validation of hybrid distillation-vapor permeation process for energy efficient ethanol-water separation," Journal of Chemical Technology and Biotechnology, 2009, 85, 502-511.

M. P. Taylor, et al., "Thermophilic ethanologenesis: future prospects for bioethanol production," Trends in Biotechnology, 2009, 27, 398-405.

M.T. Ravanchi, et al., "Application of membrane separation processes in petrochemical industry: a review," Desalination, 2009, 235, 199-244.

(Continued)

Primary Examiner — Duane Smith
Assistant Examiner — Pankti Patel
(74) Attorney, Agent, or Firm — Lawrence B. Ebert; David J. Lorenz

(57) ABSTRACT

The invention provides systems and methods for the pre-concentration of a target molecule from feed solution comprising a low concentration of the target molecule.

27 Claims, 8 Drawing Sheets

(56) References Cited

OTHER PUBLICATIONS

X. Lu, "A perspective: photosynthetic production of fatty acid-based biofuels in genetically engineered cyanobacteria," Biotechnology Advances, 2010, 28,742-746.

D. C. Ducat, et al., "Engineering cyanobacteria to generate high-value products,"—Trends in Biotechnology, Feb. 2011, vol. 29, No. 2, pp. 95-103.

M. S. Elshahed, "Microbiological aspects of biofuel production: current status and future directions," Journal of Advanced Research (Cairo), 2010, 1, 103-111.

J. A. Viera Costa and M. Greque de Morais, "The role of biochemical engineering in the production of biofuels from microalgae" Bioresource Technology, 2011, 102, 2-9.

S.-H. Ho, et al., "Perspectives on microalgal $CO_2$-emission mitigation systems—a review," Biotechnology Advances, 2011, 29, 189-198.

Miller JE (2003): Review of water resources and desalination technologies, Sandia National Laboratories, SAND 2003-0880, Albuquerque, NM.

Vane, L.M. and F.R. Alvarez. 2008. Membrane-assisted vapor stripping: energy efficient hybrid distillation-vapor permeation process for alcohol-water separation. J. Chem. Technol. Biotechnol. 83:1275-1278.

G. Zacchi and A. Axelsson, "Economic evaluation of preconcentration in production of ethanol from dilute sugar solutions" Biotech Bioeng 34:223-233 (1989).

Huang, Y., J. Ly, D. Nguyen, and R. Baker, "Ethanol Dehydration Using Hydrophobic and Hydrophilic Polymer Membranes," Ind. Eng. Chem. Res., 49, 12067-12073, (2010).

International Search Report and Written Opinion of the International Searching Authority for PCT/US11/25225.

International Preliminary Report on Patentability for PCT/US11/25225.

\* cited by examiner

VAPOR COMPRESSION STEAM STRIPPING

CROSS-REFERENCE TO RELATED APPLICATIONS

This is a continuation application of PCT Application No. PCT/US2011/025225, filled Feb. 17, 2011, which claims priority to U.S. provisional application 61/305,530, titled Vapor Compression Steam Stripping and filed Feb. 17, 2010. Both applications are incorporated by reference herein in their entirety.

BACKGROUND OF THE INVENTION

1. Field of the Invention

This invention is related to the field of concentration enhancement of a volatile product. More specifically, this invention is directed to a method and an apparatus to increase the concentration of a volatile product that is present at too low a concentration for conventional purification methods, such as distillation, to be economical.

2. Description of the Related Art

There is a current need to find alternate energy sources to substitute for the use of fossil fuels for transportation applications. For example, biologically produced ethanol has been proposed as an alternative to petroleum-derived liquid fuels. See U.S. Pat. No. 6,306,639: ethanol derived from living organisms is an attractive alternative to petroleum based fuels because it is a renewable resource. Other biologically-produced molecules, such as butanols, have also been proposed as fuels. Furthermore, such biologically-produced molecules may have applications as chemical feedstocks. A common issue in the production of these biological molecules is the separation, and purification, of the target biological molecule from other species present in the synthesis of the target. The invention disclosed herein is directed to the objective of separation and purification of target molecules.

The work described herein gives examples with ethanol, but the method could be used for other volatile target molecules, whether produced biologically or otherwise.

The problem of separating target molecules present in dilute concentrations has been recognized in the art. Vane and Alvarez in published U.S. Application 20090057128 (11/896,201) disclose a method for separation of liquid mixtures involving vapor stripping followed by mechanical compression of the vapor which is then exposed to a permeation membrane for separation of the compressed vapor. The method of Vane and Alvarez, unlike that of the instant invention, requires the use of a membrane. Furthermore, the compressor in Vane/Alvarez serves a different purpose. See also Vane, Alvarez, Huang, and Baker, "Experimental validation of hybrid distillation-vapor permeation process for energy efficient ethanol-water separation," Journal of Chemical Technology and Biotechnology, 2009. ["The energy demand of distillation-based systems for ethanol recovery and dehydration can be significant, particularly for dilute solutions. An alternative separation process integrating vapor stripping with a vapor compression step and a vapor permeation membrane separation step, termed membrane assisted vapor stripping (MAVS), has been proposed."] In MAVS, the purpose of the compressor is to force ethanol-water vapor through a selective membrane to reutilize the water vapor in the steam stripper. The compression pressure required is related to the membrane area (and its permeability), and in order to reduce the capital cost of the membrane, may be relatively high. In the present invention, the generation of steam for the stripper is almost completely through the recovery of heat from the condensed product, so the purpose of the compressor is just to raise the saturation temperatures a few degrees higher than the evaporator. See also M. P. Taylor, et al., "Thermophilic ethanologenesis: future prospects for bioethanol production," Trends in Biotechnology, 2009, 27, 398405. Separately, note PCT/US2010/043574, which describes separation using a dephlegmator (a partial condensing heat exchanger); such a process lacks the heat integration benefits of the present invention, which are more fully described below.

Other background material may be found in U.S. Pat. Nos. 4,769,113, 5,772,850, 5,968,321, and 6,899,743 (mentioning the use of a dephlegmator) and published US applications 20070031954 and 20090215139 (ethanol recovery process). On vapor compression in desalination applications, see M. T. Ravanchi, et al., "Application of membrane separation processes in petrochemical industry: a review," Desalination, 2009, 235, 199-244. Also note: X. Lu, "A perspective: photosynthetic production of fatty acid-based biofuels in genetically engineered cyanobacteria," Biotechnology Advances, 2010, 28, 742-746; D. C. Ducat, et al., "Engineering cyanobacteria to generate high-value products,"—Trends in Biotechnology, February 2011, Vol. 29, No. 2, pp. 95-103; M. S. Elshahed, "Microbiological aspects of biofuel production: current status and future directions," Journal of Advanced Research (Cairo), 2010, 1, 103-111; J. A. Viera Costa and M. Greque de Morais, "The role of biochemical engineering in the production of biofuels from microalgae" Bioresource Technology, 2011, 102, 2-9; S.-H. Ho, et al., "Perspectives on microalgal CO2-emission mitigation systems—a review," Biotechnology Advances, 2011, 29, 189-198.

The present invention in vapor compression steam stripping [VCSS] is related to the following observations.

(1) The Determinant of Purification Cost from Low Concentration Feeds is the Cost of the First Stage of Purification.

Consideration of the observed cost of distillation as a function of input ethanol concentration reveals that cost increases rapidly at low concentrations. Distillation occurs in stages, and at low concentration the gain in ethanol/water ratio is quite large and can exceed 10. Thus, for example, the total cost of distillation from 0.5% is the sum of the cost of a single stage of distillation that yields about 5% ethanol, and the cost of distillation of 5% ethanol to fuel grade. Since the cost of distillation from 5% to fuel grade is acceptable, if the cost of the first stage can be reduced to a small value similar to the cost per stage of later stages, then total cost will be acceptable. VCSS, unlike other attempts to reduce the cost of ethanol purification from dilute solutions, solves the correct problem: cost of the first stage.

(2) Vapor Compression can be Used to Recycle the Heat of Vaporization of Water.

The reason distillation is so expensive is that it is necessary to evaporate so much water, which takes a lot of energy. Vapor compression is widely used for heat recycling in water distillation. In the desalination industry, the vapor compression of the product (steam) is routinely utilized, with an average energy consumption of 30 wh per gallon of distilled water (Miller JE (2003): Review of water resources and desalination technologies, Sandia National Laboratories, SAND 2003-0880, Albuquerque, N. Mex.}. The lowest energy consumption is reported by AB Welding's desalination (water distillation) units at 15 wh/gal for units 1000 GPH and larger. (GPH denotes gallons per hour. This data is available from AB Welding, 2597 North Fordham Avenue, Fresno, Calif. 93727-8601 on request). By coupling the most energy efficient of these units with steam stripping, it is possible to concentrate ethanol from very dilute feeds to levels that would make standard distillation economically viable, while using a fraction of the energy of the latter. Conceptually, the energy taken by the compressor can be recovered through heat exchangers within the VCSS.

(3) Combining Steam Stripping and Vapor Compression

By combining steam stripping and vapor compression, it is possible to design an ethanol purification process that is continuous, removes the ethanol from an input liquid stream as completely as one wants, with a vapor phase as close to equilibrium with the input liquid stream as one wants, with an energy requirement that approaches the theoretical minimum.

In one embodiment, the present invention can be viewed as an adjunct to distillation or other methods of purification, not necessarily as an alternative.

SUMMARY OF THE INVENTION

The present invention discloses an apparatus and method for the pre-concentration of a volatile target molecule obtained from a feed solution of a dilute concentration of target molecule comprising the steps of (1) counter-current contact of the dilute feed solution and a vapor phase; (2) condensation in a condenser of the vapor phase output of the counter-current vapor-liquid contactor with transfer of the latent heat released by condensation to an evaporator; (3) evaporation of a liquid feed to provide the vapor phase input to the counter-current contactor; and (4) compression of the vapor phase. Compression of the vapor phase may occur before the contactor, after the contactor, or both before and after. The action of the compressor must result in a pressure that is higher in the condenser than in the evaporator.

The present invention encompasses embodiments of the above-noted apparatus and method wherein the apparatus runs at a capacity greater than 73 GPH, greater than 300 GPH, greater than 2900 GPH, between 73 GPH and 2900 GPH, and between 300 GPH and 2900 GPH.

DETAILED DESCRIPTION OF THE INVENTION

General Observation

The present invention on vapor compression steam stripping, unlike previous attempts to reduce the cost of ethanol purification from dilute solutions, solves the correct problem: the cost of the first stage.

Embodiment of a VCSS Apparatus

Figure 1:
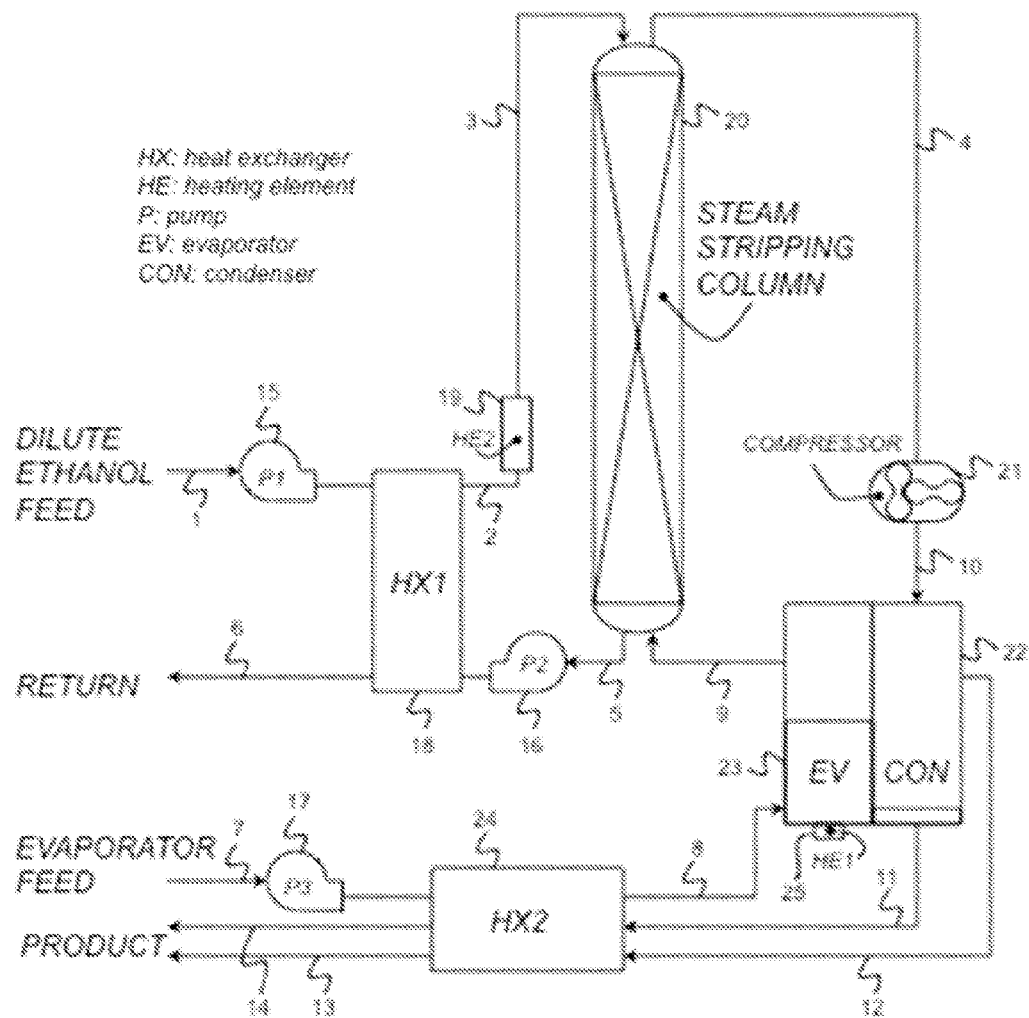
FIG. 1 shows a schematic of a VCSS apparatus in one embodiment of the invention.

Referring to FIG. 1, a dilute ethanol feed (1) is pumped (15) through HX1 (18)[HX denotes a heat exchanger, HX1 denotes a first heat exchanger], resulting in a hot liquid feed (2) and a cool return flow (6). The return flow may go back to a fermentation vessel, be processed further, or be discarded. HE2 (19)[HE denotes a heater] adds enough heat to bring the feed liquid to just below the boiling point. The liquid feed then enters the steam stripper (20), where it contacts the upward flowing vapor phase. Because the vapor phase is water saturated, there is essentially no evaporation of water from the liquid stream. Ethanol evaporates, and the ethanol concentration in the vapor phase will be close to the equilibrium concentration. As the liquid feed descends the steam stripper, it is depleted of ethanol. The amount of ethanol remaining in the return stream (5, 6) will depend on design and operation of the steam stripper, but it can readily be made small. The ethanol enriched vapor phase passes to the compressor (21), and then to the condenser (22). The pressure increase from the compressor allows the condensation to take place at a higher temperature than the evaporation process, which occurs at a lower pressure. This facilitates the transfer of latent heat from condenser to evaporator. The condensed vapor phase drains (11) from the condenser to HX2 (24) where it is used to heat the incoming water feed (7) to the evaporator (23). The cooled product is sent via (14) to storage or further processing. The heat of vaporization from the condenser provides heat for the vaporization of water in the evaporator. HE1 (25) provides additional heat as required. The vapor phase from the evaporator passes (9) to the steam stripper and rises past the downward flowing liquid stream as described earlier. Since ethanol is being evaporated from the liquid stream, it is necessary to transfer heat into the liquid stream as some combination of sensible heat transfer and condensation of water from the vapor phase. Incondensable gas is bled off from the condenser, and passes (12) to HX2 (24) where product condensation contributes to heating the water input to the evaporator and is then sent via (13) to product storage or further processing. The incondensable gas is vented. [As to thermal efficiency, the efficiency in the condensor/evaporator unit should be above 90% and thus an assumption of an 80% heat efficiency in the condensorlevaporator would underpredict the energy efficacy of the separation of the target molecule.

In an alternative configuration, the vapor phase exiting the steam stripper passes directly to the condenser. The vapor phase leaving the evaporator enters the compressor, and the compressed vapor phase then enters the bottom of the steam stripper. Details of pressure and temperature will be different with this configuration, but the principal of operation is the same and a pressure/temperature difference across the evaporator condenser is maintained such that condensation occurs at a higher temperature than evaporation.

Separately, to minimize column length and associated capital costs, it is desired for the liquid feed stream into the top of the steam stripping column to be at the onset of boiling at all times. But the boiling point is variable, depending on the ratio of volatile compound to water. Therefore, a control system is needed to control the temperature of the feed stream at the boiling point as the concentration varies. A control system for detecting with a detector the onset of boiling of a liquid mixture comprised of water and at least one other volatile compound and which provides a variable control signal to a heater to maintain the feed stream at the onset of boiling. The detector may be a microphone or piezoelectric device.

Separately, If the compressor is situated downstream of the evaporator, the superheat resulting from the compression may be better utilized in the steam stripper than in the condenser where it may reduce the area over which condensation could occur.

Further, if the system is operated'under vacuum there can be an advantage in the power required for the compression and the lower temperature rises that lead to environmental losses.

In a preferred embodiment, the condensor and the evaporator are two sides of a heat exchanger.

Working Example

Materials and Methods

A 5 GPH water distillation unit from the AB Welding company was purchased for laboratory testing and also to serve as the vapor compression component of the VCSS. Tests with tap water showed that the unit was capable of distilling up to 10 GPH with the compressor providing a 0.82 psi pressure rise. It was seen from these tests that the energy required by the machine only gradually increased with output flow rate, so that the energy required per volume of product was minimized at the highest product flow rate chosen to be 8 GPH. As such, the stripping column, which would use the steam generated from the VC [vapor compression] unit and send steam saturated with ethanol back to it, was designed to handle 7.9 GPH equivalent to 30 kg/hr.

Literature on the partition coefficient of ethanol showed that at vapor-liquid equilibrium it could be as high as 13.6 (Vane, L. M. and F. R. Alvarez. 2008. Membrane-assisted vapor stripping: energy efficient hy-brid distillation-vapor permeation process for alcohol-water separation. J. Chem. Technol. Biotechnol. 83:1275-1278.) With a 6 stage column it was calculated that the vapor leaving could have a concentration 10 times higher than the liquid feed concentration. Thus the column was designed to handle a 300 kg/hr feed. Using ⅝" stainless steel pall rings as the packing material, the column diameter was sized at 5.5" ID to prevent the occurrence of flooding and minimize the pressure drop of the steam. Empirical relations for this type of packing showed that the total height of the column needed to be at least 9 feet to achieve 6 stages of separation. It was constructed of 3 separate sections and connected with sanitary fittings to enable easy assembly and future modifications. Redirection gutters with a 0.5" lip were installed at 1.5 foot intervals to prevent the liquid feed from preferentially draining along the sides of the column and bypassing the packing material. The distribution system at the top of the column was a 4" diameter showerhead. Above this, a demisting section consisting of 3 inches of compacted knitted mesh (0.011" wire diameter) was installed.

A flat plate heat exchanger specified to heat the feed to within 1.5° C. of the stripper temperature was purchased from API. The cost of this unit was small (7-20%) compared to flat plate heat exchangers with similar specifications, but had the unique disadvantage of requiring a 45 psi head, requiring independent pumps to force the feed and waste through it. Because of this, a control system was installed that would monitor the liquid level on the bottom of the column and maintain it by proportionally closing a control valve on the waste line. A 1.5 kW immersion heater was also installed on the feed line to compensate for losses from the heat exchanger and maintain a specified feed temperature, usually just below boiling (~99.2° C.). It cycled on and off dependent on a relay tied to a temperature controller and gave rise to temperature fluctuations in the feed less than 0.2° C. rms. The use of a heat exchanger with a different head requirement would resolve the issues with the API unit.

The original centrifugal compressor for the vapor compression unit was replaced with a specially coated URAI-22 rotary lobe blower from Dresser in order to reach the extra 4 psi of pressure needed for complete condensation of ethanol at the temperature needed in the condenser. The compressor units at this size are not manufactured with seals, so as a measure to resolve this issue, its vents were plugged to prevent the loss of steam, at the added risk of forcing steam into the bearings. The speed of the compressor, which would determine not only the pressure, but the flowrate of steam into the stripper column and product rate was controlled with existing motor controller on the VC unit. It was thus mounted on the VC unit and connected to the top of the stripper column and the condenser through flexible 1.5" ID steam condensation hose. The same type hose connected the evaporator to the column. To prevent accumulation of condensate in this line and allow it to drain to the evaporator, the bottom section of the stripping column was mounted above the level of the evaporator. To allow space for instrumentation and for structural stability, the stripping column, heat exchanger and pumps were mounted on a Unistrut frame adjacent and attached to the VC unit despite the understanding that a more compact design could reduce heat loss and make the system appear more efficient. Heat loss was minimized by insulating the stripper column and evaporator/condenser and compressor with 2° compacted fiberglass and piping with a minimum of 1 inch thick polyurethane piping insulation.

Feed was stored in a 500 gallon tank, so that a 7 hr run could be sustained without influencing the composition or temperature of a premixed batch. For longer runs, all output streams including the waste and product were sent back to this tank so that feed ethanol concentration would not be diluted. An alternative embodiment would include installing a cold water heat exchanger to maintain a constant temperature in the feed tank although this did not rise above 35° C. during testing.

The power consumption of the pumps, heaters and original VC unit was monitored with power meters for the 110V and 220V inputs. In order to determine a mass and energy balance for the entire system and the performance of individual components, flow rates to and from the steam stripper and VC were monitored as well as the temperatures at heat exchanger ports. Temperatures and pressures at the evaporator, across the compressor and at the top of the stripping column were also recorded. All data was logged to a PC with a National Instruments data acquisition system (including a board with an electronic cold junction reference for thermocouples) using Labview. Thermocouples were calibrated inline and found to have less than a 0.5° C. difference between sensors. Flowrates for the feed and waste streams of the stripper were measured with Blancett B2800 rotary vane type flowmeters with a 0.01 GPM resolution. The product and makeup water rates to the VC were monitored with Omega FLR1008-D flowmeters. The latter were calibrated and periodically checked against a rotameter and timed collection in a graduated cylinder.

Ethanol concentrations in the various feed, waste and products streams were checked by HP gas chromatography flame ionization detector [GC-FID] analysis. Blind analysis of prepared samples of known concentrations showed agreement to within 2%.

Results of Separation for Working Example

Seven runs were conducted with ethanol concentrations in the feed ranging from 0.28-0.53 wt % to determine a preferred operating configuration of the VCSS. The main results of the last three of these tests are tabulated in Table 1. It is clear from these tests that the steam stripping column was able to concentrate ethanol in the feed by the expected factor of 10.

TABLE 1

VCSS experiments with 275 kg/hr feed to the stripper column.

| inlet concentration w % | enhancement factor | recovery rate % | energy use Watts | operating conditions |
|---|---|---|---|---|
| 0.35 | 13.3 | 88 | 4103 | manual evap. level control |
| 0.39 | 10.1 | 96 | 4340 | SS bottoms in evaporator |
| 0.28 | 9.8 | 97 | 4504 | SS bottoms in evaporator |

The greatest recovery rate observed was 97% during the last test. In the last two tests, a portion of the bottoms of the stripper column was used to feed to the evaporator, as it was effectively degassed and had a low ethanol content. [The use of stripper column bottoms to feed the evaporator is an optional aspect of this invention.] It should also be noted that because the degassed waste stream was also sent back to the storage tank which held the feed, the feed was also degassed to about 25% of saturation. This undoubtedly helped the VCSS performance, but in actual field conditions the feed will be saturated, so some method of degassing must be employed. An embodiment comprising directing the feed through a knock out pot just before it enters the stripper column has the capability of removing a substantial amount of air.

Figure 2:
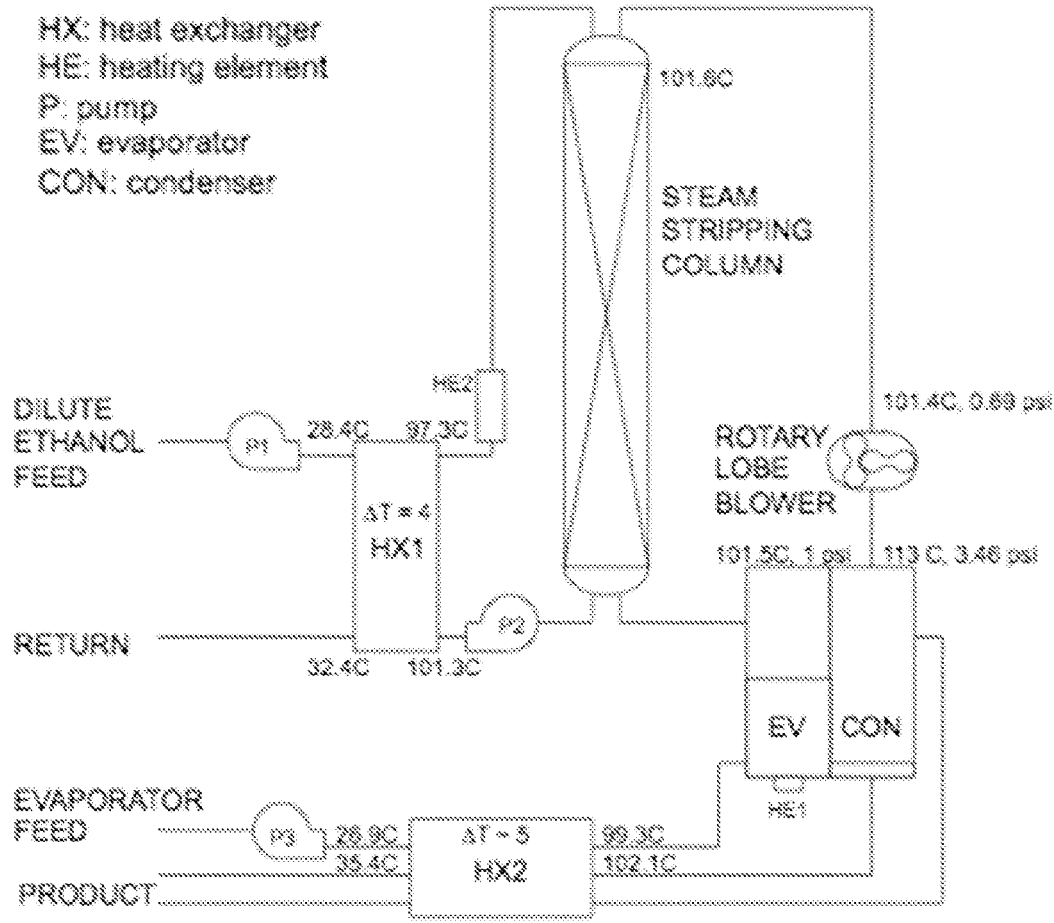
FIG. 2 shows a schematic including temperatures and pressures for an example with 0.28 wgt % ethanol feeds leading to a 97% recovery.

The total energy for the process ranged from 4.1-4.5 kW. Details are presented in FIG. 2 for a test in which flow rate measurements and ethanol concentrations on feed, waste and product lines were combined to provide a 99.9% mass balance for ethanol. It is clear from this test, which is representative of all the other tests, that HX1 could reach only a 4° C. approach, despite specifications that it should reach 1.5° C. at the given flow conditions. The trim heater can be used to compensate for this, and accounts for a major portion of the total 4.5 kW needed for the process (cf. Table 2). The evaporator-condenser varied in its performance in the VCSS in comparison to its operation in its original water distillation configuration. Here less than 90% of the steam from the evaporator is condensed in the condenser. The remaining vapor is condensed in HX2. Even the "liquid" product line is two phase when entering the heat exchanger. It is because of this extra latent heat that the feed to the evaporator is brought to 2.2 degrees C. within boiling, but the approach on the cold side of HX2 is 8.5° C. This temperature difference was close to 3° C. in the original configuration, so the extra 5.5 degree difference indicates the imperfect performance of the VC unit in the manner it is operating as part of the VCSS. Furthermore, the vapor leaving the condenser suggests that all is not working as well as in the previous example. Embodiments in which said problem is corrected would include a larger sized condensor and greater air removal in the liquid feed, reducing incondensable gas in the condenser and thereby increasing heat transfer. There is a possibilty of superheat from the compressor, preventing condensation in a substantial portion of the condenser.

TABLE 2

Energy usage in the 73 GPH VCSS.
73 GPH VCSS unit with 10 GPH VC unit producing 7.3 GPH product

| component | energy (Watts) | % energy | explanation |
|---|---|---|---|
| original 10 GPH VC unit | 1600 | 35.5% | |
| pumps | 568 | 12.6% | |
| hx1 loss (ΔT = 4.0° C.) | 1283 | 28.5% | |
| extra hx2 loss (−ΔT = 5.5) | 138 | 3.1% | |
| environmental | 915 | 20.3% | lost heat to ambient in addition to original VC unit |
| total | 4504 | | |

The breakdown of energy usage for this last test is shown in Table 2. The total represents the energy put into the heaters, pumps and compressor. A significant portion of this is the energy that would be required to run the original VC unit without a steam stripper to produce 30 kg/hr of distilled water. The power required (1600 W) was found to be the same even when the compressor was switched to a higher efficiency rotary lobe unit. The loss due to the approach of HX1 and the power required by the pumps to drive flow through it accounted for almost 40% of the energy required for the process. The extra heat loss from HX2 appears minor, because despite the large approach of 8.5° C., the flow rate is only 10% of the flow through HX1. The environmental loss, which is a loss of sensible heat to the ambient air is a catchall for all the immeasurable losses beyond that sustained by the original VC unit. Conduction heat transfer calculations based on thermocouple measurements in the midlayer of the insulation would indicate that the stripper column only loses about 100 W, while estimates for the plumbing are about 220 W. Altogether this falls short of the total 950 W which could be due to the difficulty in accounting for the small, hot, poorly insulated areas, such as occurs at junctions and valves. This example demonstrated that the heat recovery efficiency of a desalination vapor compression heat exchanger was hardly effected under the conditions of condensing dilute ethanol water vapor instead of the pure steam. It is thus surmised that the efficiency improvements seen in larger vapor compression desalination will be maintained at the lowest ethanol concentration.

Prophetic Examples on Projected Performance

The energy efficiency of the VCSS is expected to depend on size in a way very similar to vapor compression distillation equipment. In order to project expected energy use for a larger size unit, we have used two different approaches. In the first approach, we consider the observed efficiency of the experimental unit and propose several ways in which its performance should be adjusted to accurately project energy consumption in a larger scale device. This is based on several known inefficiencies which are readily corrected, empirical data from AB Welding on the energy consumption of a 300 GPH water distillation unit, and surface area scaling. In the second approach, we consider the observed energy recapture efficiency of commercially available vapor compression distillation equipment. With a VCSS unit designed according to this invention, one should have energy recapture efficiency very similar to that observed in water distillation equipment of the same size.

Overview of Examples Related To Efficiency of Scale

In the following examples, we present evidence of the large increases in efficiency which will be gained if the VCSS is implemented at large scale. In the first we present experimental data and a method to scale our experimental results to a larger scale. In the second, we show the limits of what we believe is practically achievable with this process. The last example is to show that even with a much more conservative modelling of heat recovery, (large temperature approaches) and at higher ethanol concentrations (with perhaps degraded recovery in an evaporator/condenser core) a significant benefit over conventional distillation is achieved.

PROPHETIC EXAMPLE 1

To illustrate the advantages of our invention, we developed a method to show how efficiencies scale with reactor size. In this example we show a method to scale our experimental results to a larger sized unit and demonstrate the dramatic improvement of efficiency for vapor compression steam stripping. The scaling procedure requires an analysis of energy requirements and losses in the experimental VCSS, comparison of those losses to a VC desalination unit of the same build, performance data on the components of a larger build VC unit and projections of those losses and energy requirements for components in a larger scale VCSS. As the analysis of losses in the experimental VCSS has been previously discussed, we begin with performance data for a larger sized VC unit with greatly improved efficiencies.

Data from AB Welding on vapor compression distillation to provide distilled water: When the 300 GPH unit is run to provide 290 GPH of distilled water, it consumes 3 kW for its compressor, 2.5 kW for an electrical heater and 300 watts for pumping during normal operation. The flat plate heat exchangers used for this system can reach lower than 0.5° C. approaches. Data in a report from a client's month-long test confirms that the manufacturer's specifications are met and also that no scaling or fouling would seem to be occurring.

The main assumption in the estimate is that the power consumption to the VC unit will remain the same despite operating with vapor containing ethanol. Although it is realized that a compressor that can achieve higher pressure differentials must be substituted in place of the 3 kW compressor that powers the water distillation VC unit, it is not clear yet if the power consumption will be much different, because of the low efficiencies of the former. The total gain for the large scale VC is substantial, since it will process 40 times as much steam but only use 4.6 times as much energy as the 10 GPH unit. According to the manufacturer, this reduction in energy usage per product is due to the compactness of the larger unit. It is recognized that a larger HX2 utilized with the 300 GPH VC, will perform more favorably than a smaller HX2, because it will be a single pass design, and a suitable method can be employed to remove air from the system, such as the use of a degasser.

The second major energy saving improvement in the scaleup, will be the performance of the HX1. It will need to have a substantially lower approach than what was obtained from the HX1 manufactured by API. An array of HX2s from the 300 GPH VC, which can reach an approach of 0.5° C., will be suitable. As the pressure drops across these heat exchangers are also much smaller than the API unit, pumping power is saved.

The estimated environmental loss is calculated by assuming that height of the column and run length of piping will be the same in a larger steam stripper, but the cross-section areas will increase proportionally to the scale factor. The external area, and external heat transfer would grow by the square root of the scale factor.

The results of these adjustments to the observed energy use are summarized in Table 3. The dramatic reduction in process energy per energy of product fuel goes from 80% (61,444 divided by 76,000) with the experimental 73 GPH VCSS unit to 9.4% (7155 divided by 76,000) with a 2900 GPH VCSS unit. The former is for a 0.28 wgt % ethanol feed. At the higher feed concentration of 0.60 wt % it would reduce from 37% with the experimental unit to 4.4% with the 2900 GPH unit.

TABLE 3

Projected energy usage in 2900 GPH VCSS.
2900 GPH VCSS unit with 300 GPH VC unit
producing 290 GPH product (39.86 scale factor)

| component | energy (Watts) | % energy | explanation |
| --- | --- | --- | --- |
| original 300 GPH VC unit | 5500 | 26.3% | 20 Wh/gal reported |
| pumps | 3300 | 15.8% | 330 W for 300 GPH VC hx from report. Using same hx (same ΔT) but 10X flow for column = 3000 W |
| hx1 loss (ΔT = 0.5° C.) | 6342 | 30.3% | 0.5° C. approach reported |
| extra he2 loss | 0 | | new design will have separate stream for noncondensables - expecting original efficiencies |
| environmental | 5779 | 27.6% | multiplied 915 by sort of scale factor |
| total | 20920 | | |

PROPHETIC EXAMPLE 2

In this example, we show the limits of what is practically acheivable with the VCSS process, based on the maximum efficiencies found in commercial vapor compression water desalination units.

Vapor compression provides a very effective means of heat recapture, and it is useful to have a measure of how effective heat recapture is. The energy recapture efficiency (ERE) can be defined in terms of wasted energy (WE) and total internal heat flow (H) as:

$ERE=(H-WE)/H$

As an example, consider the ERE in vapor compression distillation of water. Internal heat flows are mostly due to evaporation and condensation of water, so we may take H as 2255 kJ/kg of product. In the case of distilling pure water to pure water, the theoretical minimum energy necessary is zero, so wasted energy is the same as total energy consumed. A commercial machine rated at 20 Wh/gallon uses 19 kJ/kg, so ERE in this case is 99.16%.

In the case of VCSS, there is an unavoidable minimum energy consumption because the ethanol/water product has a higher total vapor pressure than pure water at the same temperature. That quantity vanes with the ethanol concentration of the product. With an ethanol concentration in the vapor phase of about 3%, the unavoidable minimum is about 23 kJ/kg of product. WE in this case would be the total energy used to operate the machine less 23 kJ/kg of product. In the experimental results, production at the rate of 27.5 kg/hr would correspond to a minimum energy requirement of 632 kJ/hr or 175 W. Energy use rate was 4500 W, so WE was 4,325 W. Total internal heat flow consisted of heat of vaporization of 27.5 kg/hr of water plus heating of 275 kg/hr liquid input to the stripper (ΔT=70° C.), plus much smaller heat flows in other heat exchangers. In watts, these heat fluxes were 17.2 kW and 22.4 kW respectively, for a total of 39.6 kW. Observed ERE was therefore 89%. This is a slightly lower ERE than that of a vapor compression distillation unit of the same size, 91%.

If a VCSS system is designed according to the teachings of the present invention, it will perform with energy recovery efficiency comparable to that seen in vapor compression distillation equipment of the same size. For example, a 300 gph VCSS will have total heat flux of 1580 kW. Operating at 99% energy recovery efficiency, it will have losses of 15.8 kW. Together with an unavoidable expenditure of compressor energy of about 7 kW (for 3% ethanol in the vapor phase), projected energy use rate is 22.8 kW, essentially identical to the result of the first projection.

Figure 3:
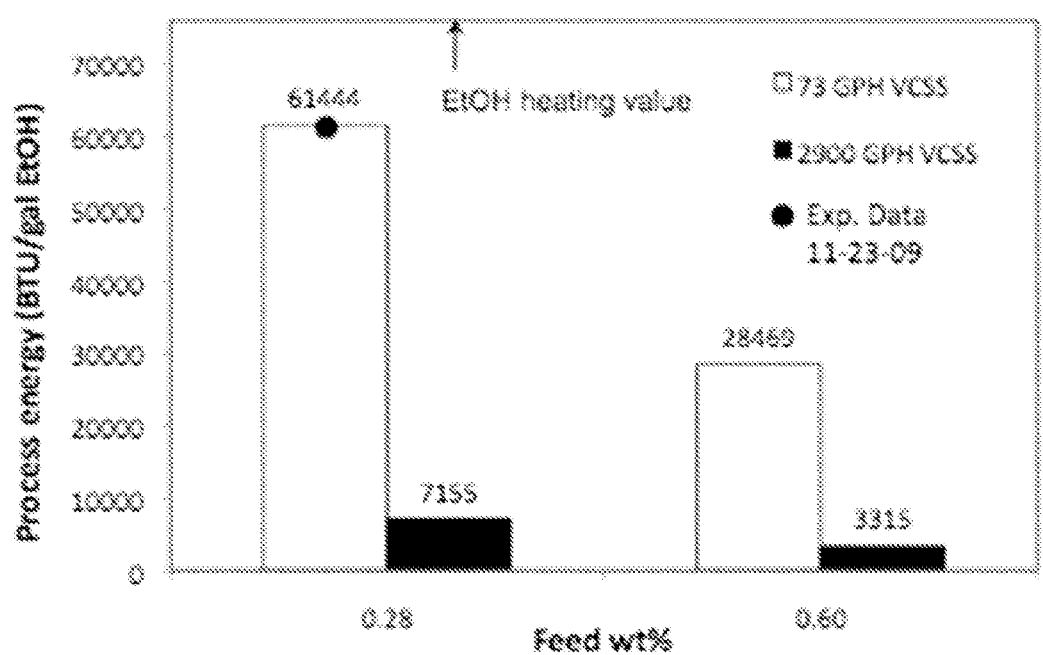
FIG. 3 shows scaled energy requirements for processing 0.28 wgt % and 0.6 wgt % ethanol feeds in one embodiment of the invention.
Figure 8:
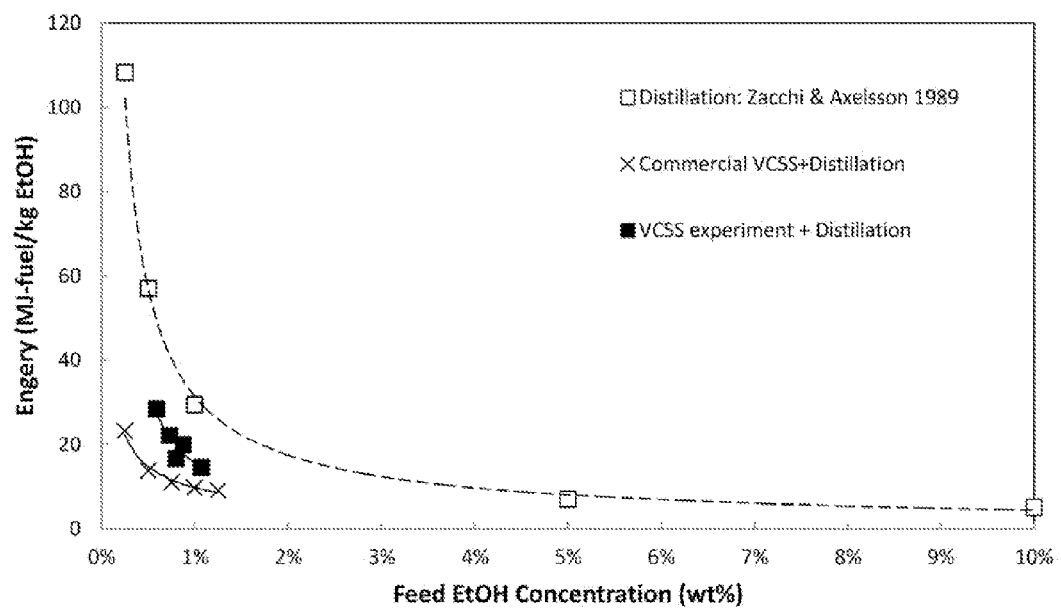
FIG. 8 shows energy required by an envisioned commercially scaled VCSS with a downstream distillation compared to conventional distillation to provide a 93.5 wt % product with 0.02 wt % waste. This figure also includes data on total energy required if VCSS experiments were combined with downstream distillation.

A comparison between the last experimental result and the projected performance (projection 1) in terms of energy per product is shown in FIG. 3. The experimentally observed energy expenditure of 61,444 Btu/gal of ethanol, was about 81% of the heating value of ethanol, which is 76,000 BTU/Gal. When the concentration of ethanol in the feed is raised to 0.6 wgt %, we expect approximately the same power will be needed (perhaps several hundred watts more to the compressor) but the amount processed will double, so that the energy required per mass of ethanol will drop to ½. The same principle will hold at larger scale. The energies will be even lower because the energy recapture efficiency will be greater. At the 3000 gph scale with 0.6 wgt % ethanol the process energy is only 4.4% of the heating value of the ethanol. For comparison, simulations (Vane and Alvarez, 2008) of Membrane Assisted Vapor Stripping (MAVS), show that to process a 1 wgt % feed, 35% of the heating value of the product is required. This, however, is a comparison of a 10× enhancement (0.6 to 6%) (4.4% process energy) with a 1-94% enhancement by MAVS (35%). A better comparison is with a 1-94% enhancement from VCSS combined with conventional distillation. The energy usage is then approximately 4.4%*(0.6/1)=2.6% for the VCSS step and 17.6% for the distillation energy for concentrating EtOH from 10-94% (as shown in FIG. 8). This gives a total of 20.2%, which is still better than MAVS. This advantage is a conservative estimate in considering that more efficient processes than conventional distillation can follow the first step of concentration by the VCSS including further steps of vapor compression distillation or MAVS itself. Following the same methodology, process energy would consume 100% of the energy content of the product if a 2900 GPH VCSS combined with conventional distillation was fed 0.16 wt % EtOH. Thus, the technology of the present invention makes it practical to purify fuel ethanol from solutions less than 5 wgt % ethanol, with the minimum feasible feed ethanol concentration below 0.5 wgt %.

[To elaborate on the origin of the numbers in FIG. 3, the number 20,920 Watts from Table 2 is equivalent to 71,387 BTU/hr from 20,920*3600 s/1055J/BTU. The flow rate of processed product would be 290 GPH with the VC unit selected such that its steam output is 1/10 the feed rate to the stripper column. The concentration of the input and outputs would be the same as that from our test of the VC unit producing 7.27 GPH, but the scale would be 39.866=290/7.3 times larger. For the test with 0.28 w % ethanol, the output flow of ethanol was 0.746 kg/hr=0.25 gph. Multiplying this by the 39.866 gives the rate of ethanol produced in the larger unit=9.98 Gal/hr. Divide 71,387 BTU/hr by 9.98 Gal/hr will give 7155 Btu/Gal.]

Experiments with a Degasser

Figure 4:
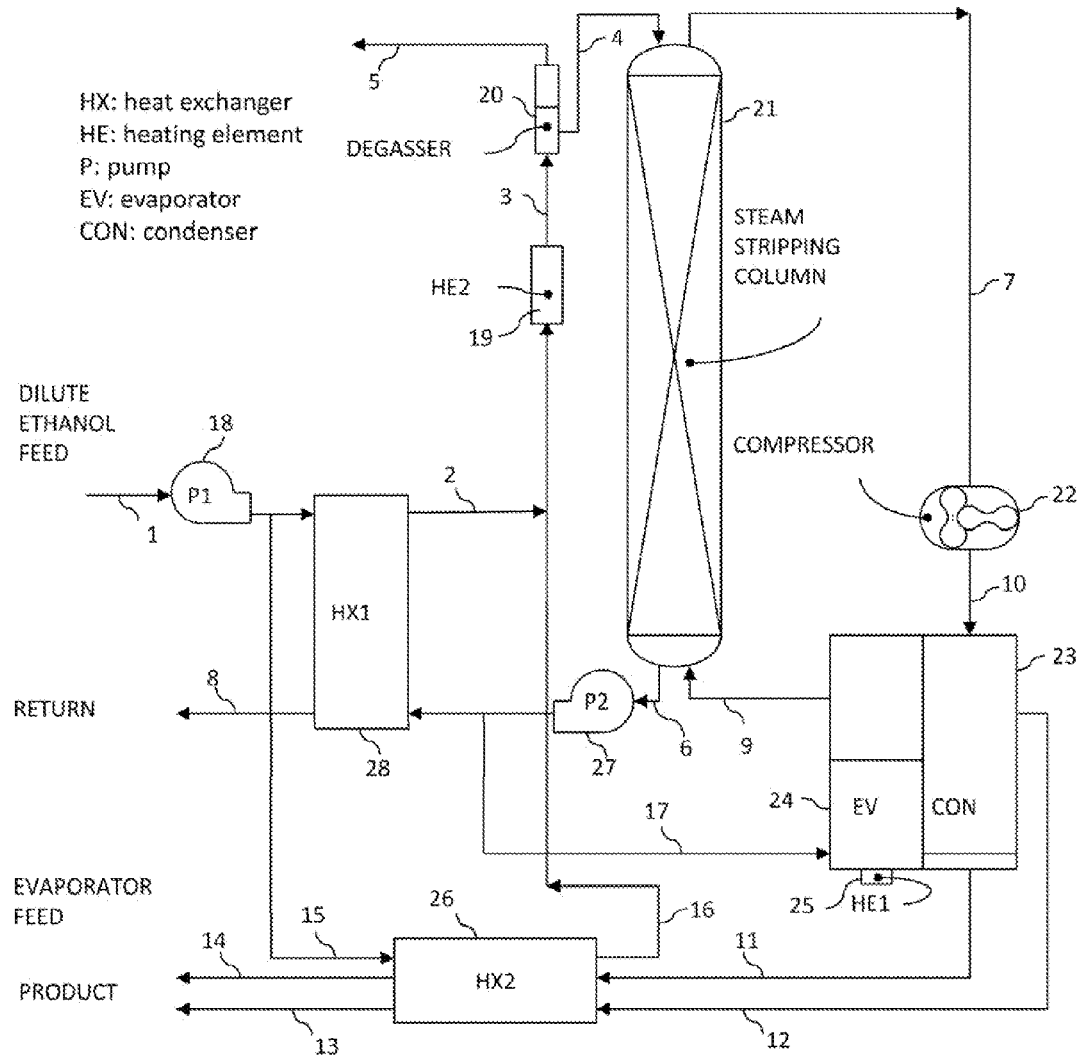
FIG. 4 shows a process flow diagram of VCSS experiments performed with a degasser.
Figure 5:
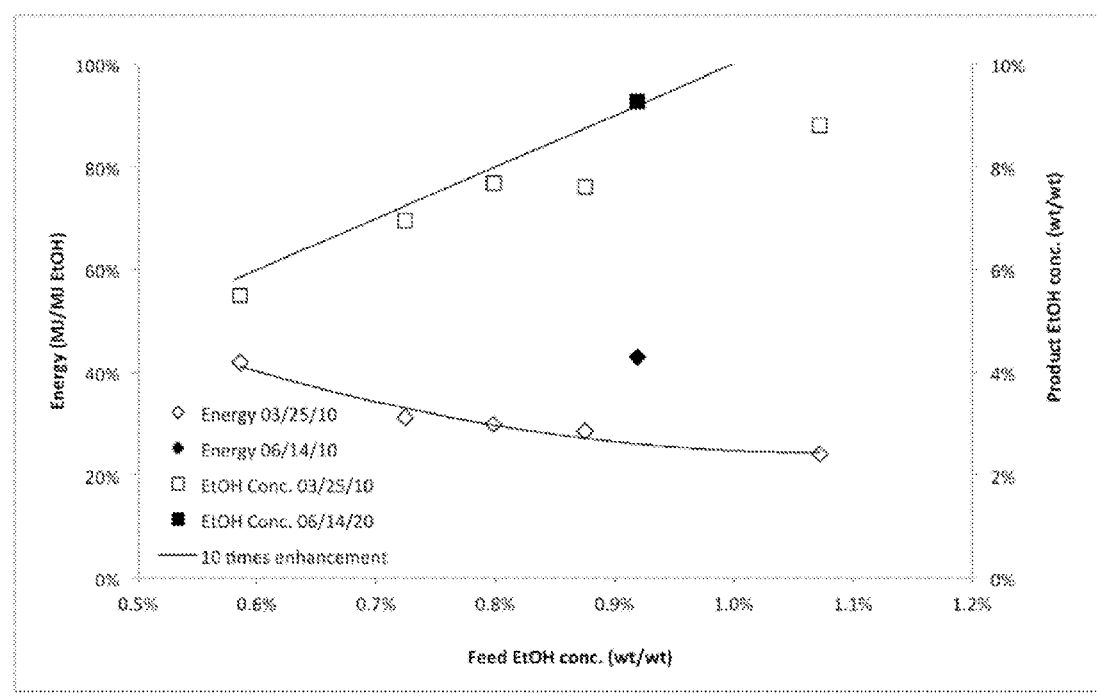
FIG. 5 shows enhancement of ethanol concentration using the VCSS and energy requirements in experiments performed in 2010.

An embodiment of the VCSS was created by modification (cf. FIG. 4) of earlier arrangements to include a degasser above the column to reduce the amount of incondensables entering the column with the feed. This was done because early tests showed that large amounts of air impeded the performance of the condenser and reduced heat recovery. This is well known problem in the art of vapor compression water desalination. Also, 1/10 of the waste stream from the bottom of the stripper column was sent directly to feed to the evaporator. As this was split off before passing through HX1, 1/10 of the cold feed to the stripper was also redirected to be heated in HX2, which would otherwise preheat any feed to the evaporator. In this way, the bulk flow rates in the countercurrent direction in HX1 and Hx2 where matched and could operate the most efficiently. Although the systems and controls were set to manage this change in the flow, for more ease in contra it is suggested to revert to the original scheme.

Figure 6:
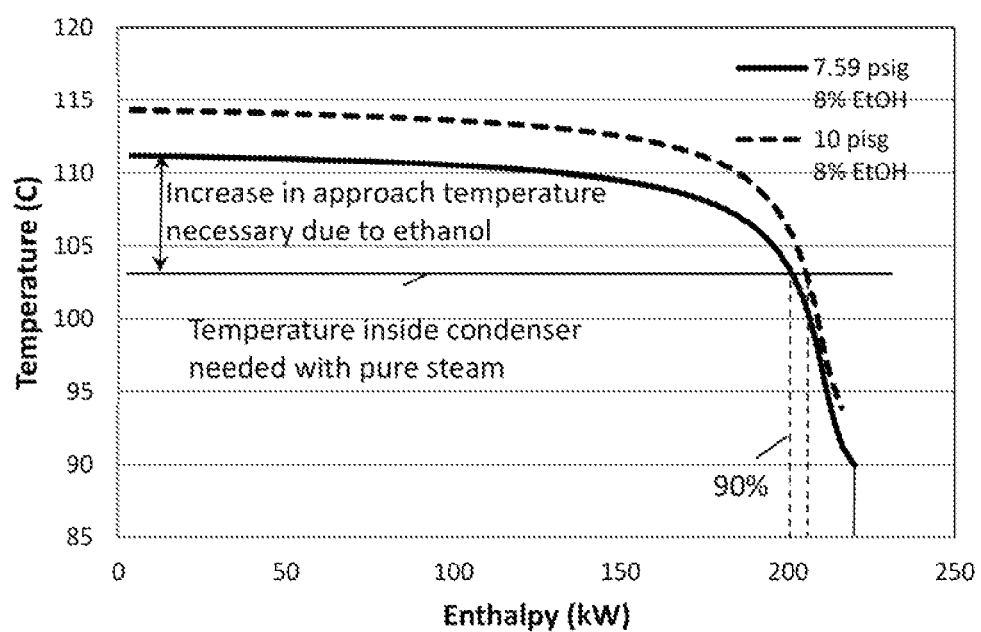
FIG. 6 shows a temperature-enthalpy curve showing temperature glide and theoretical maximum heat recovery possible with a compressed 8 wt % EtOH steam and the corresponding temperature difference in the EIC following the process of differential condensation.

Experimental measurements on this embodiment were performed with higher ethanol concentrations in the feed ranging from 0.6-1.1 wt % in the feed corresponding with conservative expectations of what could be economically concentrated. FIG. 6 shows that the VCSS was able to concentrate feed to result in a product that was 5-9 wt %. The enhancement varied from 9-10, while the lower enhancements at high ethanol concentrations appeared to be associated with less accurate mass balances for the ethanol. It is important for the compressor to be matched with the expected pressures and temperatures. In early experiments, as the compressor needed to be run at higher pressures and temperatures for the higher ethanol concentrations, its performance began to degrade, and subsequently the compressor developed several leaks. The higher pressure also distorted the condenser, which was designed to handle lower pressures and allowed some leakage into the evaporator. The pump that handled the hot waste from the steam stripper also was found to have damaged seals. This sort of failure would not occur when processing condensate collected from bioreactors, because of the absence of minerals. The problem was remedied with a condenser with better external support, but identical plate thickness which was constructed to sustain the higher pressures.

The compressor was fit with better seals and the pump was repaired to improve the overall mass balance. In subsequent measurements, the mass balance was at 99.5% compared to the experiment that used a 1.1 wt % feed previously was only 98.2%. The mass balance for just the ethanol was 103.5% as compared to 90% previously. The extra 3.5% above 100% is within our gas chromatography and flow measurement error of 4%.

With the prevention of losses from the system, the later run produced 9 wt % ethanol with a 0.9 wt % feed. This run showed a 10-fold enhancement in the product as was expected from the system modeling and was demonstrated at the lower concentration (and pressure) experiments that had better mass balances. Thus, in an embodiment of the VCSS invention, a feed of 0.8 wt % ethanol yields an 8 wt % ethanol product. Lower feed concentrations would result in a lower concentration product. Providing an 8% product, with less than a 0.8 wt % feed would require a higher enhancement, which could be achieved by operational changes or configuration modifications. By operating at a lower steam to feed ratio it would be possible to closer match enhancement with vapor liquid equilibrium (ranging from 13.6 to 11) but this will reduce the overall ethanol recovery from the feed. Alternatively, a rectifying section could be added to the top of the stripper to provide some reflux. The feed would enter the stripping section below this as in a standard distillation column. This would also require more energy.

It should be noted that 8% is a concentration chosen to represent a suitable "beer" that could be processed to fuel grade ethanol using conventional distillation and mol sieve drying.

For the experiments with 0.6-1.1 wt % ethanol the process required 4.7-5 kW to run. As feed concentration is increased, the specific energy consumption, the process energy required compared to the lower heating value of the ethanol in the product, is decreased. This is because of the increased ethanol throughput at high concentrations while the energy consumption was relatively constant. The specific energy consumption was high for some experimental data because the total amount of product was 50% lower than what was generated before. This was almost certainly due to the lower amount of steam (also −50%) that was generated by running the compressor at a slightly lower speed. If steam was generated at the design rate it is expected that the process energy consumption would be about 33% and close to the trendline for the rest of the data.

VCSS design: It is desired to demonstrate the most energy efficient (but cost effective) process for the ethanol concentration. As the heat fluxes necessary to generate steam and bring the feed up to temperature are very large in comparison to the energy that can be produced by the product, very efficient heat recovery is required. As HX1 has the highest heat flux of all the components, it is important for its temperature approaches to be minimal so that heat recovery is near 100%. Flat plate heat exchangers can perform this task and are readily sized for any approach temperature based on empirical data. The material and manufacturing cost drives what is practical for our process. The heat flux through the E/C core is of a comparable size so the efficiency of this equipment is equally important. However, the heat recovery performance of these devices is not well predicted (especially for binary mixtures) this is best selected following industrial experience and laboratory testing. For example, a 7 GPH E/C core that was tested, distilled pure water at 90% heat recovery, but the same E/C core only recovered 85% of the heat with our ethanol-water mixture in the VCSS process.

The actual temperatures (thus pressure required) and recovery rates of the E/C core depends on the details of how the vapor is separated from the condensate as it condenses. In the case of condensate being well mixed with the vapor through the entire process (integral condensation) the partition of product into its separate phases can be determined directly from the VLE curve for a particular temperature. In the differential condensation case the condensate is removed as the condensation progresses and looses contact with the remaining vapor. Thus the remaining vapor becomes very much enhanced in concentration as condensation proceeds and a much lower temperature is required to condense it. This temperature glide can also be determined from a VLE curve. As the E/C core operates betweens these two idealizations, the recovery rate will determine how much latent heat is transferred and thus the fraction of the vapor will remain in the uncondensed state and the temperature limits for it to occur. In the experimental run with 0.8 wt % ethanol, and 85% condensation, the temperature differentials at the exit of the condenser appears to be 7°-9° C. above the evaporator temperature based on these two calculation methods. The remainder of the noncondensed vapor is condensed in HX2 where lower temperatures are available for cooling. The composition of the feed and condenser operating pressure affects the temperature glide (FIG. 6) and thus the condensation partition between the E/C core and HX2. Higher pressure will result in more condensation in the E/C core, but is effective only if the overall energy to the process is reduced. Alternatively, larger surface area in the E/C core is required if the pressures and temperature approaches are excessive. The most efficient heat recovery will take operation pressure and heat exchange area into account and balance between operating and capital costs.

Figure 7:
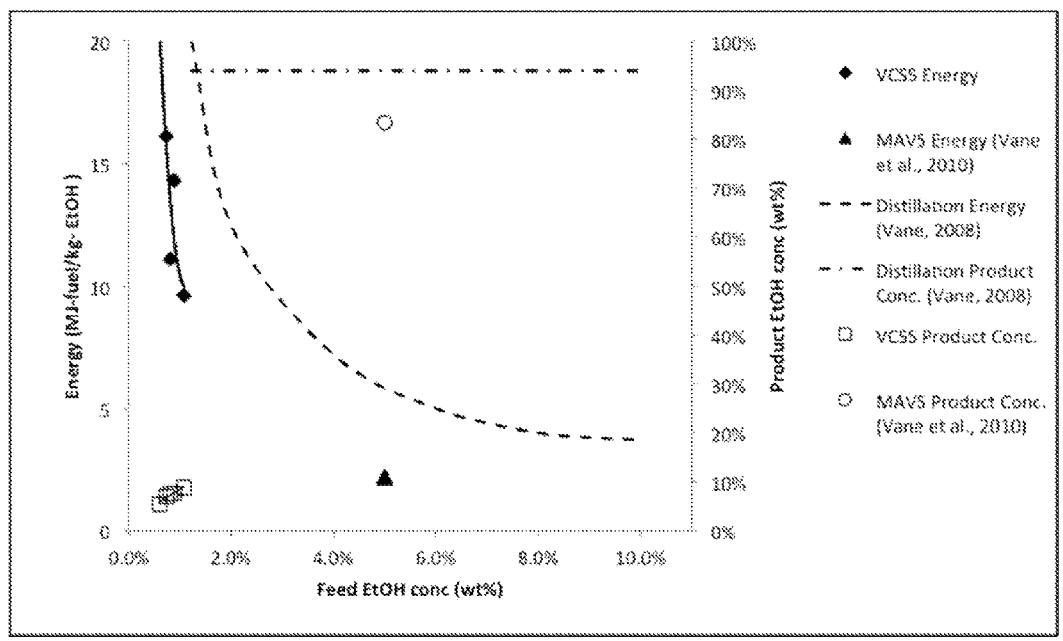
FIG. 7 shows ethanol enhancement and energy consumption by VCSS compared to MAVS and conventional distillation.

The plot in FIG. 7 shows the energy consumption and ethanol enhancement with the VCSS process using 2010 data as well as values modelled by Vane for Membrane Assisted Vapor Stripping (MAVS) and distillation. For this purpose the data for energy consumption by the VCSS, which was experimentally only run with electricity, was adjusted to account for a 33% efficiency in electricity production, while excess heat would be provided by combustion, leading to slightly higher values than reported in FIG. 4. Although MAVS and distillation generate much greater product concentrations, at low feed concentrations (0.6-1 wt %), the energy distillation requires, exceeds the energy value of the product (a LHV of 76,00 BTU/gallon). For this reason, these processes are not utilized at very low feed concentrations. To better compare our results with such a process, the distillation model that was used in Vane's work from Zacchi and Axelsson (G. Zacchi and A. Axelsson, "Economic evaluation of preconcentration in production of ethanol from dilute sugar solutions" Biotech Bioeng 34:223-233 (1989)) was reproduced on Aspen Plus and extended to model lower concentrations. It was set with 30 stages and 10 degree C. approach heat exchangers, to produce a 93.5 wt % product with a 0.02 wt % bottoms. It was confirmed that it matched the distillation simulation presented in Vane's work. Similarly, A VCSS model that could closely predict commercial results was coupled with a downstream distillation process to deliver the same product and waste. Here the heat exchangers in the vapor compression step of the process were set with 5 degree C. approaches. Finally, for purposes of showing the benefits of the present invention, we include the calculation of the fuel energy would be needed using the small scale experimental VCSS coupled with the same downstream distillation process. The comparison between these processes in FIG. 8 for the various feed concentrations show the energy required by the VCSS processes in the ethanol range from 0.6-1.1 wt % to be ⅓ to ½ the energy of pure conventional distillation. With a feed of 1 wt % the simulated VCSS+distillation process energy is 9 MJ/kg EtOH which is 33% of product energy (a LHV of 76,00 BTU/gallon for ethanol). This is identical to what Vane and Alvarez (2008) have reported for a MAVS simulation with 1% feed concentration. Even with these very conservative estimates of heat recovery for our VCSS+distillation process, it is this reduction in process energy for dilute ethanol feeds that makes this process valuable and economically feasible. At the higher heat recoveries seen with the larger vapor compression systems, as detailed in prophetic examples 1 and 2, the savings can be much more dramatic than this.

Having now fully described the present invention in some detail by way of illustration and examples for purposes of clarity of understanding, it will be obvious to one of ordinary skill in the art that the same can be performed by modifying or changing the invention within a wide and equivalent range of conditions, formulations and other parameters without affecting the scope of the invention or any specific embodiment thereof, and that such modifications or changes are intended to be encompassed within the scope of the appended claims.

One of ordinary skill in the art will appreciate that starting materials, reagents, purification methods, materials, substrates, device elements, analytical methods, assay methods, mixtures and combinations of components other than those specifically exemplified can be employed in the practice of the invention without resort to undue experimentation. All art-known functional equivalents, of any such materials and methods are intended to be included in this invention. The terms and expressions which have been employed are used as terms of description and not of limitation, and there is no intention that in the use of such terms and expressions of excluding any equivalents of the features shown and described or portions thereof, but it is recognized that various modifications are possible within the scope of the invention claimed. Thus, it should be understood that although the present invention has been specifically disclosed by preferred embodiments and optional features, modification and variation of the concepts herein disclosed may be resorted to by those skilled in the art, and that such modifications and variations are considered to be within the scope of this invention as defined by the appended claims.

As used herein, "comprising" is synonymous with "including," "containing," or "characterized by," and is inclusive or open-ended and does not exclude additional, unrecited elements or method steps. As used herein, "consisting of" excludes any element, step, or ingredient not specified in the claim element. As used herein, "consisting essentially of" does not exclude materials or steps that do not materially affect the basic and novel characteristics of the claim. In each instance herein any of the terms "comprising", "consisting essentially of" and "consisting of" may be replaced with either of the other two terms.

When a group of materials, compositions, components or compounds is disclosed herein, it is understood that all individual members of those groups and all subgroups thereof are disclosed separately. When a Markush group or other grouping is used herein, all individual members of the group and all combinations and subcombinations possible of the group are intended to be individually included in the disclosure. Every formulation or combination of components described or exemplified herein can be used to practice the invention, unless otherwise stated. Whenever a range is given in the specification, for example, a temperature range, a time range, or a composition range, all intermediate ranges and subranges, as well as all individual values included in the ranges given are intended to be included in the disclosure. In the disclosure and the claims, "and/or" means additionally or alternatively. Moreover, any use of a term in the singular also encompasses plural forms.

We claim:

1. A process for concentration of ethanol from a dilute feed solution comprising ethanol comprising the steps of
   (a) counter-current contacting of the dilute feed solution and a vapor phase input to a counter-current vapor-liquid contactor with the counter-current vapor-liquid contactor to produce a vapor phase output of the counter-current vapor-liquid contactor and an outgoing depleted feed solution;
   (b) condensing in a condenser of the vapor phase output of the counter-current vapor-liquid contactor, wherein the vapor phase output of the counter-current vapor-liquid contactor is conveyed to the condenser such that the composition of the vapor phase output is substantially maintained, to produce a condensed liquid product that leaves the condenser, with transfer of latent heat released by condensation to an evaporator;
   (c) evaporating of a liquid feed to provide the vapor phase input to the counter-current vapor-liquid contactor;
   (d) compressing of the vapor phase output of the counter-current vapor-liquid contactor or the vapor phase input to the counter-current vapor-liquid contactor, wherein compression of the vapor phase may occur before the counter-current vapor-liquid contactor, after the counter-current vapor-liquid contactor, or both before and after the counter-current vapor-liquid contactor, wherein the action of the compressor must result in a pressure that is higher in the condenser than in the evaporator, wherein no membrane is used in the process and whereby ethanol is concentrated; and
   (e) reducing by a heat exchanger the temperature of the outgoing depleted feed solution leaving the counter-current vapor-liquid contactor to a temperature close to the temperature of the dilute feed solution before said dilute feed solution enters said heat exchanger.

2. The process of claim 1 in which the mass of the dilute feed solution entering the counter-current vapor-liquid contactor is substantially the same as the mass of depleted feed solution leaving the counter-current vapor-liquid contactor.

3. The process of claim 1 in which the mass of the vapor phase entering the counter-current vapor-liquid contactor is substantially equal to the mass of the vapor phase leaving the counter-current vapor-liquid contactor.

4. The process of claim 1 in which the mass of the liquid feed to the evaporator is substantially equal to the mass of the condensed liquid product leaving the condenser.

5. The process of claim 1 in which heat required to produce the vapor phase input to the counter-current vapor-liquid contactor is substantially equal to the latent heat released by condensation of the vapor phase output of the counter-current vapor-liquid contactor.

6. The process of claim 1 in which the heat exchanger used to heat the incoming dilute feed solution and cool the outgoing depleted feed solution is a counter-current heat exchanger.

7. The process of claim 1 in which condensation and evaporation occur in a heat exchanger.

8. The process of claim 1 in which the increase in pressure caused by the compressor is sufficient to result in complete condensation of the vapor phase output of the counter-current vapor-liquid contactor at a temperature greater than the boiling temperature of the liquid feed used to provide the vapor phase input to the counter-current vapor-liquid contactor.

9. The process of claim 1 in which the temperature in the condenser is approximately the temperature in the evaporator.

10. The process of claim 1 in which the temperature of the dilute feed solution entering the vapor-liquid contactor is close to its boiling temperature.

11. The process of claim 1 in which the temperature of the liquid feed entering the evaporator is dose to its boiling point.

12. The process of claim 1 in which the process is operated in such a manner that positive gauge pressure is maintained throughout the steps of the process.

13. The process of claim 1 in which the dilute feed solution is at least partially degassed before entering the counter-current vapor liquid contactor.

14. The process of claim 1 in which a portion of the vapor phase output of the counter-current vapor-liquid contactor that has passed through the condenser containing a substantial amount of incondensable gas is sent to a counter-current heat exchanger in which the condensable vapor is condensed to transfer its latent heat to raise the temperature of the liquid feed to the evaporator and the incondensable gas is vented.

15. The process of claim 1 in which the liquid feed to the evaporator is at least partially degassed before entering the evaporator.

16. The process of claim 1 in which a part of the depleted feed solution exiting the bottom of the counter-current vapor liquid contactor is sent to the evaporator.

17. The process of claim 1 in which the concentration of ethanol in the condensed liquid product is at least 5 times the concentration of ethanol in the dilute feed solution.

18. The process of claim 1 in which the dilute feed solution is less than 1 wgt % ethanol.

19. The process of claim 1 in which the dilute feed solution is less than 0.5 wgt % ethanol.

20. The process of claim 1 wherein there are two stages of purification arranged so that the output of the first stage becomes the input of the second stage.

21. The process of claim 1 in which the bulk of the dilute feed solution, the vapor phase input, the vapor phase output, the depleted feed solution, the condensed liquid product and the liquid feed are water.

22. The process of claim 1 in which the condensed liquid product comprises primarily water.

23. The process of claim 1 in which the heat exchanger is heat exchanger (18).

24. A process for concentration of ethanol from a dilute feed solution comprising ethanol comprising the steps of
  (a) counter-current contacting of the dilute feed solution and a vapor phase input o a counter-current vapor-liquid contactor with the counter-current vapor-liquid contactor to produce a vapor phase output of the counter-current vapor-liquid contactor and an outgoing depleted feed solution;
  (b) condensing in a condenser of the vapor phase output of the counter-current vapor-liquid contactor, wherein the vapor phase output of the counter-current vapor-liquid contactor is conveyed to the condenser such that the composition of the vapor phase output is substantially maintained, to produce a condensed liquid product that leaves the condenser, with transfer of latent heat released by condensation to an evaporator;
  (c) evaporating of a liquid feed to provide the vapor phase input o the counter-current vapor-liquid contactor;
  (d) compressing of the vapor phase output of the counter-current vapor-liquid contactor or the vapor phase input to the counter-current vapor-liquid contactor, wherein compression of the vapor phase may occur before the counter-current vapor-liquid contactor, after the counter-current vapor-liquid contactor, or both before and after the counter-current vapor-liquid contactor, wherein the action of the compressor must result in a pressure that is higher in the condenser than in the evaporator, wherein no membrane is used in the process and whereby ethanol is concentrated; and
  (e) reducing by a heat exchanger the temperature of the condensed liquid product leaving the condenser to a temperature close to the temperature of the liquid feed to the evaporator before said liquid feed to the evaporator enters said heat exchanger.

25. The process of claim 24 in which the heat exchanger used to heat the liquid feed to the evaporator and cool the condensed liquid product is a counter-current heat exchanger.

26. The process of claim 24 in which the heat exchanger is heat exchanger (24).

27. A process for concentration of ethanol from a dilute feed solution comprising ethanol comprising the steps of
  (a) counter-current contacting of the dilute feed solution and a vapor phase input to a counter-current vapor-liquid contactor with the counter-current vapor-liquid contactor to produce a vapor phase output of the counter-current vapor-liquid contactor and an outgoing depleted feed solution;
  (b) condensing in a condenser of the vapor phase output of the counter-current vapor-liquid contactor, wherein the vapor phase output of the counter-current vapor-liquid contactor is conveyed to the condenser such that the composition of the vapor phase output is substantially maintained, to produce a condensed liquid product that leaves the condenser, with transfer of a n heat released by condensation to an evaporator;
  (c) evaporating of a liquid feed to provide the vapor phase input to the counter-current vapor-liquid contactor; and
  (d) compressing of the vapor phase output of the counter-current vapor-liquid contactor or the vapor phase input to the counter-current vapor-liquid contactor, wherein compression of the vapor phase may occur before the counter-current vapor-liquid contactor, after the counter-current vapor-liquid contactor, or both before and after the counter-current vapor-liquid contactor, wherein the action of the compressor must result in a pressure that is higher in the condenser than in the evaporator, wherein no membrane is used in the process, whereby ethanol is concentrated and wherein energy required by the process is less than 10% of the heating value of the ethanol in the condensed liquid product.

* * * * *

UNITED STATES PATENT AND TRADEMARK OFFICE
CERTIFICATE OF CORRECTION

PATENT NO. : 8,628,604 B2  
APPLICATION NO. : 13/481143  
DATED : January 14, 2014  
INVENTOR(S) : Benjamin Moll et al.

Page 1 of 1

It is certified that error appears in the above-identified patent and that said Letters Patent is hereby corrected as shown below:

In the Specification

Column 14, line 16, delete "76,00" and insert --76,000--.

Column 14, line 41, delete "76,00" and insert --76,000--.

In the Claims

Column 16, line 45, delete "dose" and insert --close--.

Column 17, line 19, delete "o" and insert --to--.

Column 17, line 33, delete "o" and insert --to--.

Column 18, line 26 delete "a n" and insert --latent--.

Signed and Sealed this  
Twenty-seventh Day of May, 2014

Michelle K. Lee  
*Deputy Director of the United States Patent and Trademark Office*